PROCESS FOR THE MANUFACTURE OF CHARCOAL

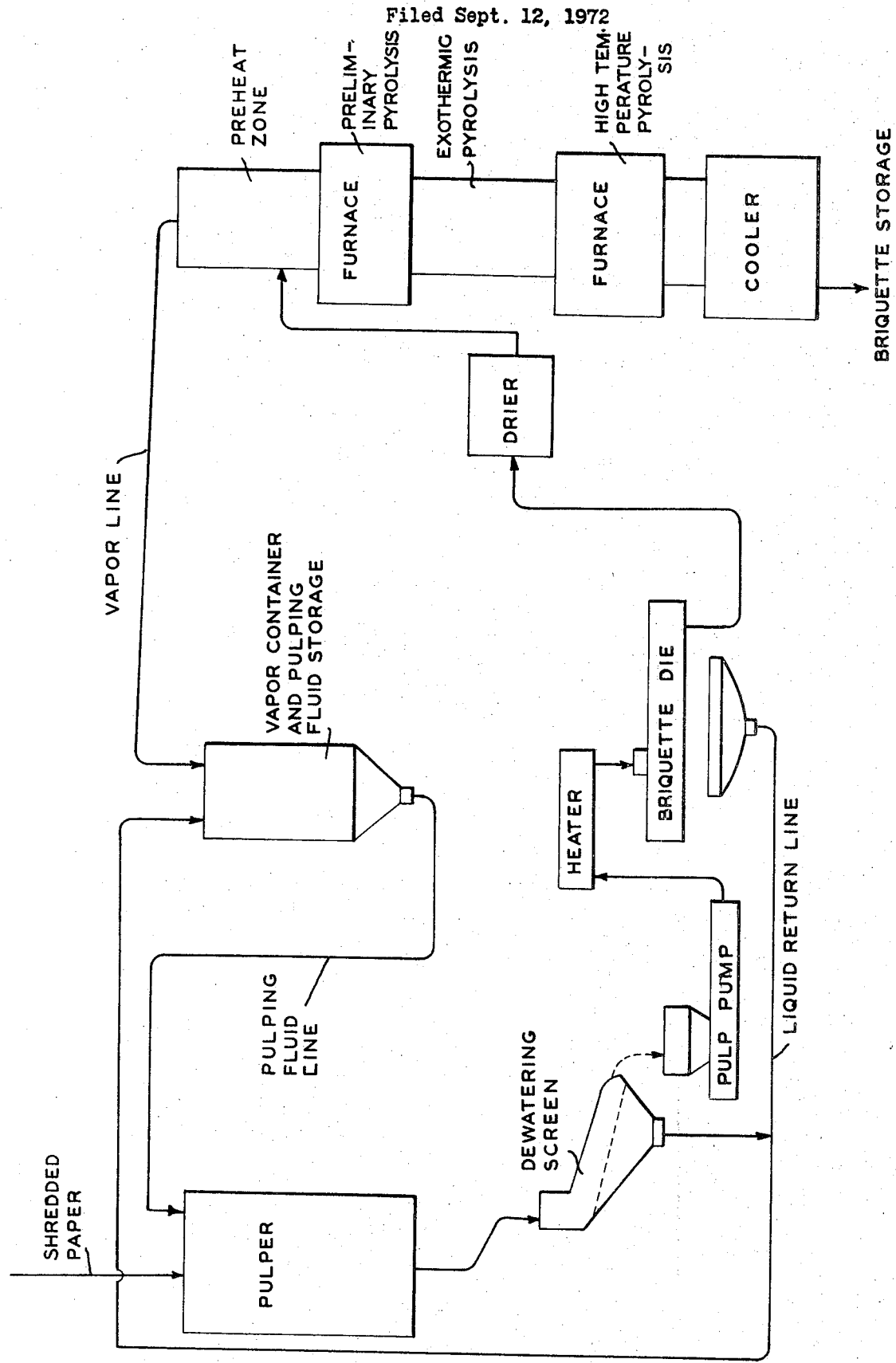

Philip S. Osborne, Oklahoma City, Okla., assignor to The Oklahoma Publishing Company, Oklahoma City, Okla.
Filed Sept. 12, 1972, Ser. No. 288,462
Int. Cl. C10b 53/08
U.S. Cl. 201—2.5
6 Claims

ABSTRACT OF THE DISCLOSURE

A process is provided for converting fibrous material into high quality charcoal by sequentially pulping shredded fibrous material with water, partially dewatering the resulting pulp, pressing the partially dewater pulp into briquettes, and then pyrolyzing the pulp briquettes in the presence of recycled oils and tars obtained from a previous pyrolysis treatment. In addition to the high quality charcoal briquettes, the pyrolytic treatment yields a by-product liquid condensate containing oils and tars, which can either be admixed with the pulping water or used to impregnate the partially dewatered pulp briquette prior to pyrolysis. The proces is especially applicable to the conversion of waste paper, alone or admixed with other fibrous material, to produce novel, high quality, hard charcoal briquettes having a density within the range of about 0.35 to 0.60 gram/cc.

---

The present invention relates to an improved process for the manufacture of high quality charcoal from fibrous materials. More particularly, the invention pertains to the conversion of a fibrous material such as waste paper into hard and dense charcoal briquettes as well as the novel charcoal briquettes as an article of manufacture.

In recent years there has been considerable emphasis on the reclamation of solid trash or rubbish because of the environmental problems caused by the present methods of disposal which include open dumping and incineration or land-filling. Such methods of disposal cannot be employed indefinitely, and therefore new technologies are neded for the recovery of trash and recycling or utilizing certain components for the manufacture of new products.

It has been estimated that more than half of the trash collected and transported to dumps is waste paper, i.e., paper, paperboard, and the like. Authorities have stated that the potential value of waste paper literally dwarfs the other values in ordinary trash because of the predominance of waste paper in the trash and the considerably higher value of recovered cellulose fibers. One proposal for reusing the waste paper involves subjecting the waste paper to pyrolysis, often referred to as destructive distillation, wherein heat is applied externally in the absence of air to effect decomposition. Pyrolytic processes have been used previously to convert wood and coal into char or charcoal briquettes and various chemical products. Efforts to make char or charcoal briquettes from pyrolyzed waste paper have met with limited success because the char retains the physical characteristics of the original paper. The resulting char is recovered in the form of very thin sheets or flakes which are difficult to briquette and therefore require excessive amounts of binders. In some instances attempts have been made to overcome this problem by performing the waste paper into blocks or by adding other materials such as wood chips to the waste paper prior to preforming, but these efforts have also failed to give a charcoal briquetts having acceptable physical characteristics.

The use of waste paper to prepare briquettes or artificial fuels is described in U.S. Pat. Nos. 719,047 (1903); 1,497-, 866 (1924); 2,475,766 (1949); 3,070,485 (1962); and 3,402,032 1968). Representative articles dealing with trash, including waste paper, reuse are "Conversion of Municipal and Industrial Refuse Into Useful Materials by Pyrolysis" by W. S. Sanner et al., Report of Investigation 7428, U.S. Department of the Interior, Bureau of Mines (1970); "New Resource" by R. R. Grinstead, Environment, vol. 12, No. 1 pp. 3 to 17 (1970); and "Recycle Paper and Save the Dump" by Jerome Olds, Organic Gardening and Farming, July 1970.

In accordance with the present invention it has now been found that high quality charcoal briquettes can readily be prepared from fibrous materials such as waste paper by conducting pyrolysis of pulp briquettes in the presence of by-product oils and tars obtained from a previous pyrolysis treatment. The general process comprises a series of sequential steps entailing pulping the fibrous raw material with a pulping fluid, partially dewatering the resulting pulp, pressing the partially dewatered pulp into the form of briquettes, and then pyrolyzing the pulp briquettes at elevated temperatures to obtain the desired charcoal briquettes as well as by-product oils and tars. The latter, after condensation, are admixed with the fibrous feed material prior to or during the pulping step in accordance with the preferred method of operation. However, it is also possible to impregnate or saturate the pulp briquettes with the by-product oils and tars prior to the pyrolysis step. The reuse of these by-products oils and tars is an essential feature of the present invention.

Other processing steps which may be employed include preheating the partially dewatered pulp prior to briquette formation and further drying the pulp briquettes prior to pyrolysis. These steps as well as those outlined above will be described in greater detail hereafter.

The charcoal briquettes recovered from the pyrolysis step are generally cooled to room temperature under controlled conditions to ensure production of a stabilized product. Part of the cooling can be done in a separate section in the pyrolysis furnace utilizing external cooling means such as air circulation or in a separate cooling apparatus. In general, it is preferred to effect cooling under an inert atmosphere, at least until the temperature has been lowered to ambient conditions and then gradually adding atmospheric air and moisture.

Although the process of this invention will be described below mainly in conection with the use of shredded waste paper as the raw feed fibrous material, it will be understood that it is also applicable to other fibrous materials such as wood chips, natural and synthetic cloths, fibrous agricultural wastes, straw, begasse, etc. alone or admixed with each other or with waste paper. The use of waste paper as the main fibrous feed material is, however, preferred. It is also possible to add char fines or dust, obtained in the practice of this invention, to the mixture of fibrous material and water undergoing pulping. Other materials which can be employed to enhance pulping as well as the subsequent treatments include binders, dispersing agents, air entraining agents, flotation agents, fillers, and the like. Conventional binders can be utilized, although gluten-containing binders or starch are preferred. The dispersing agents may also be one or more of those known to the art, although the use of alkali metal or alkaline earth metal lignosulfonates have been found to be especially effective in the practice of the present invention, since it also acts as an air entraining agent. Dispersing agents such as polyethylene oxide, polyelectrolites, etc. may also be used. The amount of binder will generally range from about 0.5 to 5, preferably from about 0.5 to 1, percent by weight; while the dispersing agent will range from about 0.05 to 5%, preferably from about 0.3 to 0.5, percent by weight. Both of these weight percentages being based upon the total weight of the dry paper fibre.

Other additives, including recycled char fines or dust, if employed at all, will be added in minor amounts and generally in amounts of less than about 20% by weight.

The exact nature of the oils and tars generated during pyrolysis, which are condensed and recycled in accordance with the present invention, is not fully known at the present time. However, the description of the oils, tars and other liquid condensates obtained during pyrolysis found in the Sanner et al. Bureau of Mines Report 7428, supra, is believed to be very similar in nature to those obtained in the present invention. Although a gradual build up of the oils and tars occurs, equilibrium appears to be reached at about 20 to 25% by weight of oils and tars in the pulping fluid. In general, it is preferred to recycle all of the by-product oils and tars. If the amount of oils and tars in the pulping fluid exceeds about 25% by weight, a portion of the by-product oils and tars can be withdrawn from the system and stored until needed, or used for alternate purposes such as fuel and the like.

In the production of improved charcoal briquettes by the process of the present invention, shredded waste paper is added to a water-based pulping fluid and the mixture is agitated or pulped until the shredded paper is defiberized and the paper is substantially returned to a fibrous mass similar to that from which it was made. This pulp is partially dewatered and pressed into the desired briquettes. The formed pulp briquettes are then dried and pyrolyzed to produce preformed charcoal briquettes.

Pulping can be undertaken successfully from approximately 1 to 10% solids in the water-fiber mixture. The preferred method is to add about 5% dry fiber to 95% water based pulping fluid. Although waste paper is the preferred fibrous material, it is possible, and in some cases desirable, to add fiberized cloth, such as cotton, or waste wood products such as sawdust. Fiberized artificial fiber such as nylon, rayon, and viscose may be added. Thus, the process is not limited to ground stock such as waste newspaper, but could be applied to high cotton content papers, cotton fibers, or mixtures of sawdust paper and artificial fibers, and the like.

In order to produce a pulp that, when pressed into briquette form, will have a greater unfired strength, binders can be used. One of the preferred binders is wheat shorts, which is high in gluten, and which promotes some shrinkage during the drying process and, therefore, a denser briquette. However, starch from various sources also can be used. The amount of binder can vary from about 0.5 to 5%, preferably from about 0.5 to 1% by weight based on the weight of the dry paper fiber. A further important feature of the pulping process is the addition of lignosulfonates as a dispersing agent and as an air-entraining agent. When such additives are used, the pulping time is reduced to less than half of the time normally required. Further, air bubbles are entrained in the pulp during the pulping process; and at the cessation of agitation, the entire pulp mass or fiber mass partially freed of water floats to the surface of the pulping tank where it can be removed as a very wet, but partially dewatered pulp. The lignosulfonates may be one or more of the alkali metal or alkaline earth metal lignosulfonates such as sodium or potassium lignosulfonate. An additional advantage of improving the dewatering properties is realized. The amount of lignosulfonate employed may vary from about 0.1 to 5.0%, and preferably from about 0.1 to 0.5%, by weight based on the dry weight of the paper.

In actual practice, the waste paper is pulped with an excess of water and the mixture of water and fiber placed on a screen and dewatered. This can be a vibrating or rotating screen, and in this step the water content is reduced from about 95% to about 83% based on the weight of the pulp. The partally dewatered pulp is then placed in a perforated die and the excess moisture is mechanically pressed from the pulp while the pulp is being formed into the desired shape. Preferred shapes are disks or lozenges of paper fiber from which most of the water has been expressed leaving a paper pulp briquette containing approximately 40% water.

The waste paper briquette can go directly to the pyrolizing furnace or can be dried with the use of waste heat to remove additional water. Either process seems to work quite well; however, predrying results in a denser char briquette and is therefore preferred. During pyrolysis, as the temperature is gradually raised, the excess moisture in the briquette is first driven off. When the temperature reaches approximately 440° F., some breakdown of the paper fibers occurs, and carbon dioxide, gas, water vapor as well as some combustible gases are formed. As the temperature gradually rises, more combustible gases and light-weight oils, vapors, and gases are formed. Throughout the entire pyrolysis process, there is some carbon dioxide and water vapor formed, as well as methane gas, wood alcohol and several light and heavy oil fractions. The oils and tars that are formed during pyrolysis are important in the chemistry that is promoted during the pyrolysis operation, and their addition to the pulping step results in denser and fiber-free charcoal upon pyrolysis.

It is preferred to have as much oil and tar present in the pulp to be pyrolyzed as possible. Therefore, the oils and tars produced during pyrolysis as well as the water-soluble pyrolysis fractions, such as water and acetic acid, are returned as a liquid condensate to the pulping fluid, where it is mixed with the water and the fiber being pulped. Other oils and tars can be used especially coal tar or the high phenol derivatives of coke manufacture or of charcoal manufacture to supplement the recycled liquid condensate. Although petroleum based oils and tars can be used for this purpose, they are not as effective as those oils having a phenolic ring base. The oils and tars produced during pyrolysis amount to 8–15% of the dry weight of the fiber being pyrolyzed.

During pyrolysis the temperature is gradually raised from ambient temperature to 800–850° F. These are the temperatures quite common in the production of charcoal from hard woods or from sawdust. The maximum temperature is maintained below 900° F. to leave some oils and high boiling point tars in the carbon. This improves burning characteristics and, for purposes of charcoal briquettes, makes the product much easier to light and to use. Higher temperatures can, however, be used successfully to produce charcoal for other purposes. For instance, at approximately 1472° F. water vapor or steam can be introduced into the char mass; and a reaction takes place between the water and the carbon, producing carbon monoxide gas and hydrogen. Also, during the process above described, the carbon is activated. That is, all of the pores and microstructure of the carbon are cleansed of organics and a highly microporus structure is formed which has the properties of being able to selectively adsorb odors of colors. Pyrolysis is generally carried out at atmospheric pressure.

The water vapor formed during pyrolysis acts somewhat as a steam distillation process, and there are some oils and tars carried over with the water vapor. However, the higher boiling point oils and tars are not liberated until the higher temperatures where little, if any, water vapor is formed.

Pyrolyzing at temperatures of above about 800° F. causes the reduction in volume of the briquettes pyrolyzed. At 850° F. this reduction is approximately 40% in volume. Oils and tars formed range in viscosity from less than water to materials that are solid at room temperature. Much of the oils and tars of pyrolysis form in the retort, only to migrate to areas in the retort of lower temperatures and there recondense on the pyrolizing particles or briquettes. Some of the oils and tars actually escape from the pyrolysis retort and are recovered as a condensate. As previously mentioned, these condensed fractions are returned to the pulping fluid and are used as make-up fluid, or make-up liquid, in the total process. The recycling of oils and tars permits a build-up of oil and tar in the fiber being pyrolyzed to an excess of 20% by weight of the fiber. During the recycling of oils and tars, some of the tars again boil off and are recovered as condensate. Some are cracked chemically leaving behind a carbon or high boiling point residue and producing a low boiling point fluid, liquid or a gas. As a consequence, the total amount of oil that will build up in the pulping fluid is limited.

Following the pyrolysis step the resulting charcoal briquettes are cooled to room temperature and stored under a substantially inert atmosphere until they stabilize. This may require approximately about 48 hours.

In accordance with another feature of this invention, it has been found that a particularly effective pyrolysis furnace or treatment will comprise at least four zones or steps. These zone steps are: (1) pre-heating; (2) preliminary pyrolysis; (3) exothermic pyrolysis; and (4) high temperature pyrolysis. In operation, a furnace capable of performing these functions in sequence is fed with, for example, briquettes made from waste paper pulp at ambient temperature. In the preheat zone the temperature of this material is gradually raised to in excess of 212° F., preferably in a range of about 212° F. to 300° F. At this temperature all of the free moisture is driven out of the feed material and leaves the retort. The temperature in the preheat section should be held above 212° F. so that very little material in the preheat zone is at a temperature at which moisture will recondense upon the particles. This avoids re-expansion of the particle which is important if it is a compressed briquette or pellet.

After the temperature has been raised to above 212° F. in the preheat section, the material is transferred either by gravity or by other means to the step of preliminary pyrolysis, where the temperature is again raised by external heating to a temperature between about 550° to 600° F. The exact temperature employed may vary somewhat with the chemical composition of the feed without departing essentially from the essence of the present invention. The temperatures used are those which apply to pulped briquetted waste paper. When a temperature of between about 550° to 600° F. has been reached by all or part of the material in the preliminary pyrolysis zone, exothermic pyrolysis begins to take place. That is, the chemical decomposition of the fiber or paper present is such that the decomposition releases energy sufficient to heat the materials, not yet at pyrolyzing temperatures, and cause them to begin to pyrolyze.

From the preliminary pyrolysis zone, the pyrolyzing material is transferred by gravity or other means depending on the design of the furnace, to the exothermic pyrolysis zone where the continued autopyrolysis of the material takes place. The temperatures that will exist in the exothermic zone are from about 500° to 600° F. at the top or commencement of the zone to 650°–700° F. at the lower end or terminus of the zone or towards the center of the zone, the center being the centerline axis of the furnace, if it is a tower furnace, or the central body of the charge, if other design is used. This variation in temperature is caused by the self-insulating properties of the material, that material residing closest to the external boundaries probably being somewhat cooler than that in the center of the charge.

After exothermic pyrolysis is substantially complete, the material is transferred to the high temperature pyrolysis zone where high boiling point oils and tars are either further driven from the pyrolyzed material or where additional pyrolysis is encouraged, to reduce the volatile content of the charcoal to approximately 15% of the weight of the charcoal. This step will produce a charcoal briquette with sufficient volatiles remaining to permit easy ignition without excessive smoking. If it is desired to produce a low volatile char, such as would be required to prepare the charcoal for activation, the temperature can be raised from above the 800° F. to as high as 1600° F.

Whatever the desired end product, high temperature pyrolysis is followed by a cooling of the char to a temperature of between 350° F. to ambient temperature and a storage of this material in an inert or oxygen-free atmosphree until ambient temperatures are reached.

In order to understand why superior charcoal is made by this process, it is important to describe the theories behind the chemical or thermochemical reactions taking place and their interrelationship. In the preheat zone during constant operation of the furnace, the temperatures are held at above 212° F. which does not permit the condensation of water vapor on the incoming charge; but does permit the condensation of low boiling point oils and tars generated in the pyrolysis section of the furnace to condense on the incoming charge and to partially penetrate this material. The result, therefore, is a particle or briquette with the surface and parts of the subsurface substantially augmented in their oil and tar content. As the particles enter the preliminary pyrolysis zone, the oils and tars are partially boiled off and return to the preheat zone, but are also partially pyrolyzed, leaving behind a resdiue of charcoal or high boiling point hydrocarbons partially filling the voids existing betwen the fibers or the particle being pyrolyzed. Furthermore, oils and tars generated in the exothermic pyrolysis zone rise into this preliminary pyrolysis zone where they condense on the briquettes and augment the oils and tars already present.

As the briquettes leave the preliminary pyrolysis zone and enter the exothermic pyrolysis zone, the process of evaporation and condensation takes place again. The oils and tars deposited in the preliminary zone are partially revaporized to condense in the upper sections or prior traversed sections of the retort, while part of these oils and tars pyrolytically break down to lighter oils and gases and to the char and high boiling point residues that continue to fill the remaining voids in the particles or briquettes being treated. At this point another important process begins to take place; that is, both the tars being generated in the exothermic pyrolysis zone itself and those being generated in the high temperature pyrolysis zone and transported to the exothermic pyrolysis zone begin to react with the fiber contained in the particle or briquette. And although this reaction is not fully understood, symptomatically it can be seen as a partial solution or softening of the fiber and a coalescing of fiber to fiber through the included oils and tars, with the visual result that the fibrous structure, originally very obvious in the particle or briquette made from waste paper, pulp or fiber, is lost and a non-fibrous charcoal results. This non-fibrous, partially pyrolyzed material then leaves the exothermic pyrolysis zone and enters the high temperature pyrolysis zone; and here the residual oils or tars plus the products of high temperature pyrolysis are driven from the particle or briquette as high boiling point oils and tars, leaving a charcoal particle of non-fibrous nature as a finished product.

This product is then cooled and stabilized in a cooling zone, which may also be part of the pyrolysis furnaces, until it is essentially inert in the atmosphere and will not support auto combustion. If this product is removed from the furnace at too high a temperature, or if it is exposed to oxygen or water vapor too quickly or too rapidly, there is a very good possibility of ignition and burning.

Throughout the entire retort operation described above, some non-condensable gases, and gases and vapors not condensable above 212° F., leave the pyrolysis furnace and are either condensed or are confined and the non-condensable combustible gases used to support pyrolysis. These combustible gases can be used for external firing of the retort; or part of these gases can be burned to heat the remaining gases and the heated gases returned directly to the retort for recovery of their oil, gas and heat content.

The pyrolysis process as above described can take place in a tower retort or it can also take place in a multiple hearth retort or batch retort where there is maintained a progressing pyrolysis zone. In fact, any design of rotort can be used where the sequence of steps described above can be maintained and the temperature ranges controlled. In fact, without departing from the novelty of this sequence of steps, intervening steps could be introduced between these main steps. For instance, the preheat zone could be a device outside the actual retort where preheating of the charge takes place by external heating or by the use of all or part of the oils and gases normally leaving the retort. One advantage to this is as follows: a dry, fiberized mass of paper pulp could be preheated to the approximate 212° F. that is prescribed in the preheat zone. This processing takes place outside the pyrolysis retort and the oils and tars and gases of pyrolysis passed through this mass so as to condense the low boiling point oils and tars contained in the pyrolysis retort gases on the surfaces of the fiberized mass. This material could then be passed through a briquetting or a pelletizing machine forming particles or briquettes of an oil and tar bonded nature. Under these circumstances, temperatures less than 212° F. might be satisfactorily used so as to include some moisture in the bonding agent. Thus, it can be seen that the sequential steps and temperatures of processing might be separated one from another, or have additional processes interspersed between them without departing from the novelty of the process or without affecting the unexpected results obtained by the practice thereof.

Referring now to the figure, which is essentially a flow sheet illustrating the processing steps as well as some useful apparatus, raw shredded waste paper or prepulped waste paper is fed to a pulping device. Here the raw paper is added gradually, to a water based pulping fluid comprised of water, plus the oils, tars, and condensates derived from pyrolysis. The pulping device for pilot plant purposes may be a pair of 55-gallon drums to be used alternately. In practice, raw paper is added to heated pulping fluid and the material agitated with whatever binders, additives, fillers, or dispersing agents are desirable, until the pulp mass is completely defiberized and no identifiable particles of paper remain. Normally with the addition of lignosulfonate as a dispersion agent, the time necessary for pulping is 45 minutes, using a 20-gallon batch of material and pulping 3 pounds of paper per batch. The pulp paper mass complete with the water with which it is pulped is then separated using a dewatering screen on which the fiber plus 85% liquids is retained while the excess fluid passes through the screen. This screen can be a rotating cylindrical screen or a vibrating screen large enough in area to accept the fiber and liquid pulped in the preceding batch operation. With vibration or agitation a large amount of the water normally used in pulping is removed and the pulp consistency, that is the percent solids in the pulp increases from 5% found desirable during the pulping operation to 14% to 16% during the dewatering process. The water removed during the dewatering process is returned to the pulp fluid storage tank, as shown in the diagram. The dewatered pulp is then fed, either mechanically or by hand, to a metering-type pump. One of the more effective pumps for this purpose is the Moyno Pump, which is a positive displacement, modified screw-type pump capable of metering a known amount of pulp per revolution of the pump.

Dewatered pulp is pumped through a preheater into the perforated forming die, at consistencies approximately 85% water and 15% fiber. When a predetermined amount of pulp is forced into this die, approximately 30 grams of paper fiber on a dry basis, the pump is stopped or its output diverted, and pressure is applied mechanically to the die. From the time the die is closed and pressure applied to the time that densities above 0.5 grams per cc. are attained in the subsequently dried briquette, requires approximately 2 minutes, using a 2-inch diameter die and pressing a single 55 gram briquette, 1⅛ inches in thickness. Increasing the temperature of the pulp to be pressed reduces the time necessary for compression. This time might be shortened to less than 1 minute in the die, under conditions where pulp temperatures are maintained above 120° F. Upon completion of the forming and dewatering of the pulp briquette, the briquette will contain between 50 and 58% solids when pressed at temperatures below boiling. It is believed that compression at temperatures above boiling, will further reduce the moisture content. Experiments have indicated that maximum density of the briquette can be obtained at approximately 80 to 85% solids. Therefore, if the solid can be increased to the 80 to 85% range by utilizing a high-temperature forming technique, pulp briquette densities in excess of 0.6 grams per cc. can be expected.

The dewatered, formed pulp briquettes are removed from the press and placed in a dryer, as shown, which also acts as a storage means wherein briquettes can be temporarily stored and concurrently dried through the use of waste exhaust gases from the pyrolysis furnace. The dried pellets weighing 30 to 40 grams each are then introduced either continuously or in batches to the retort feed. This can be accomplished either by hand or mechanically. The proposed retort feed is of a sealed type to exclude atmospheric air from the retort and to contain the gaseous and vaporous by-products of pyrolysis within the system during pyrolysis.

The pyrolysis retort is 10 to 15 inches in diameter and 8 to 10 feet in height. Raw fiber briquettes are fed near the top of this tubular retort passing through a preheating and drying zone and enter the first pyrolysis section where the temperatures are maintained above 550° F. Here pyrolysis is commenced. As the material gradually travels downward into the pyrolysis retort, it leaves this preliminary heating section and enters the exothermic section of the retort, where pyrolysis proceeds utilizing the exothermic energy of the reactions taking place. When this reaction is substantially complete, at temperatures approximately 600° F., the material enters a secondary heating zone where the temperatures are raised to 800°–850° F. to remove the high boiling point oils and tars still remaining in the charcoal. These oils and tars rise into the exothermic section of the furnace and there condense on the pyrolyzing fiber briquette, and enter into a chemical/physical reaction with the fibers. This reaction causes a partial destruction of the fiber, a material shrinkage of the briquette, and an increase in the apparent density of the briquette as the voids within the particle are filled with pyrolizing oils and tars. Thus, the fibrous briquettes entering the retort have densities ranging from 0.40 to 0.52 grams/cc. while the finished briquettes, having lost 70% of their original weight and 40% of their original volume, still exhibit densities near 0.5 gm./cc. due to the reabsorption and retention of pyrolyzed oils and tars. As the charcoal continues through the pyrolyzing retort, it leaves the high temperature section of the retort and enters a cooling section, where the briquettes are cooled by air, externally circulated about the retort until the temperature of the briquettes is reduced to less than 350° F. The briquettes are then removed from the pyrolysis retort by means of a screw or other transport device and passed to an air-tight briquette storage and curing tank where the temperature again drops, and where atmospheric air and moisture can be added gradually when the temperature is approximately ambient. Here both air and water vapor, or moisture, gradually absorb into the charcoal briquette and stabilize an otherwise quite reactive particle, minimizing the possibility of autoignition of the finished briquettes. Commercial practice indicates that a curing time of about 30 hours is that required for stabilization of the finished particle, after which the briquettes can be handled in the atmosphere, can be stored, transported in bulk, or bagged and shipped without danger of autoignition. Following this curing step there are screening and bagging steps not diagrammatically shown.

During the dewatering and the forming process, excess water used during the pulping process is expelled. This liquid is returned by way of a drain line and pump to the condenser and pulp-water storage tank as shown in the Figure. During pyrolysis of the dried fiber briquettes, water vapor, oils, tars and various gases both combustible and non-combustible are formed. These leave the pyrolysis furnace in the form of vapors and gases and are also returned to the combination condenser and pulp-water storage tank where the condensable fractions remain in the pulping fluid. The pulping fluid is thus recovered for reuse wherever possible. From each 100 pounds of pulp produced of 5% consistency, the cumulative weight of liquids recovered from each of the dewatering or condensing processes are:

| | Pounds |
|---|---|
| Screen dewatering | 66.60 |
| Die pressing | 24.78 |
| Pyrolysis | 1.50 |
| Total | 92.88 |

This leaves 2.12 pounds of water to be made up for each 5 pounds of dry paper processed, or 46% by weight. If the preheating of pulp to above 212° F. reduces the moisture remaining in the briquette as expected, this required makeup of liquids can be further reduced.

The non-condensable gases (a combustible mixture of carbon dioxide, carbon monoxide, methane, and some non-condensable organic vapors) may be returned from the condenser to the pyrolysis furnace for combustion. Here they are either fired and used as the sole source of pyrolysis furnace fuel, or are mixed with natural gas to attain the heat and temperatures required for pyrolysis. The production of gas is not constant or uniform during pyrolysis.

The exhaust gases from the furnace which will contain the products of combustion of the gases and vapors of pyrolysis as well as of natural gas, can be used as a heat source for the predrying of pulp pellets or briquettes. These exhaust gases are then released to the atmosphere, either directly or through an after-burner, depending upon their composition.

Atmospheric air or air drawn from the cooling section of the pyrolysis retort can be passed through the pellet storage and dries and comes in direct contact with the pellets. This air, containing some moisture and some organic vapors, can then be used as the air supply to the pyrolysis furnace.

The invention will be more fully understood by reference to the following illustrative embodiments. Unless otherwise indicated, all of the percentages given are by weight.

EXAMPLE 1

Four pounds of dry shredded newspaper is pulped in 20 gallons of pulping fluid, to this is added 5% wheat shorts by weight of dry fiber, up to 20% recycle charcoal ground to minus 100 mesh, and 0.5% alkali metal lignosulfonate. This combination of materials results in a pulp having a solids content of from 2.35% to 2.95%. The pulping fluid is water to which is added the liquid condensate of a previous pyrolysis run. The oil and tar containing liquid condensate is added to the pulping fluid as it is produced. The pulp fluid has a pH of 1 to 2 due to the buildup of organic acids.

The pulped mixture is then partially dewatered by placing the pulp on a screen and allowing the water to drain out. This method of removing the liquid results in a pulp containing 84% to 86% water (pulping fluid).

The partially dewatered pulp is then heated to approximately 120° F. to reduce the viscosity of the contained liquids and placed in a perforated die. Pressures of 500 to 2000 p.s.i. are then applied and part of the remaining water expelled, resulting in a formed fiber briquette containing 42 to 50% moisture by weight of the damp briquette. Briquettes thus formed are then oven dried and placed in the pyrolysis retort. The oven dried briquettes have an apparent density of 0.48 to 0.52 gm./cc. In the pyrolysis furnace the temperature is gradually raised to 600° F. and pyrolysis of the briquettes commenced. The furnace temperature is then held between 500° F. and 600° F. until off gasing ceases (approximately 2 hours). The temperature of the retort is raised to 850° F. which is maintained until off gasing again ceases (approximately 1 hour); and the temperature is then lowered to ambient. The finished charcoal briquettes are removed from the retort.

The pyrolysis retort is fitted with a tar trap and condenser which permits the recovery of a liquid condensate containing oils, tars, water and other condensables, produced during pyrolysis and which are recycled to the pulping fluid. The non-condensables are combustible and are burned.

The above described process results in charcoal briquettes with densities ranging between 0.35 to 0.5 gm./cc. These briquettes are hard and clean.

In comparative runs, it was found that without the addition of the liquid condensate to the pulping fluid a charcoal briquette is produced having a density of about 0.25 to 0.35 which is undesirably soft, thereby easily soiling the hands or marking up surfaces, and quite friable, i.e., easily pulversized in the fingers. Moreover, without the addition of the liquid condensate the charcoal briquette when examined under a microscope is easily identified as a charred fibrous product, each fiber retaining to a large extent its original characteristic. In contrast, when the liquid condensate is recycled in accordance with the present invention, the fibrous characteristic of the waste paper pulp is lost and a crystalline structure is obtained which is still highly combustible and very much harder than the simply charred fiber.

EXAMPLE 2

(A) Three pounds of dry shredded newspaper are pulped in 20 gallons of fluid containing both water as well as the oil and tar liquid condensate obtained from a previous pyrolysis treatment. A mixture of 0.02 pound of alkali metal lignosulfate and 0.03 pound of wheat shorts is added as a binder. The pulp mixture is then thoroughly pulped in a mechanical pulping device and the resulting pulp-water mixture placed on a screen and the water allowed to drain. This technique results, as in Example 1, in a pulp containing approximately 84–66% pulping fluid. The partially dewatered pulp is then heated to approximately 120° to reduce viscosity of contained liquids and placed in a perforated die. In this particular experiment, 500 pounds per square inch pressure is applied to a 7½″ diameter die. The resulting pulp block is then further dried and cut into 1″ x 1″ x 1″ cubes. These cubes were then pyrolyzed in a batch pyrolysis furnace following the procedures disclosed in Example 1. The resulting char has a density 0.4 to 0.5 gram per cubic centimeter and has a non-fibrous quality with hard and clean surfaces.

(B) Comparative Run—Three pounds of dry shredded paper are added to 20 gallons of water, but none of the oil and tar containing liquid condensate is added to the pulp. However, 0.5 pound of wheat shorts is added as a binder. This mixture is then thoroughly pulped, as in Examples 1 and (A), dewatered, heated and again pressed in a 7½″ diameter die, in this case at a total pressure of 500,000 pounds over the total surface of the die. The resulting pulp block is then dried and cut again into 1″ x 1″ x 1″ cubes. The density of the unfired cubes is 0.492 gram per cubic centimeter. These cubes are then pyrolyzed at 850°–900° F. maximum. The resulting char is of a soft and obviously fibrous nature, having a density of 0.335 gram per cubic centimeter. This run shows that, despite the use of elevated pressure and the addition of wheat shorts to improve the density of the resultant pulp block as well as the density of the resultant char, the char produced neither lost its fibrous or paper-like characteristics during pyrolysis or matured during pyrolysis to a char of sufficient density and hardness to be a commercially acceptable charcoal briquette.

The above data show that the practice of the charcoal briquette manufacturing process of this invention, and particularly the reuse of the oil and tar containing liquid condensate from a previous pyrolysis treatment, leads to new and unexpected results as well as obvious manufacturing advantages.

While particular embodiments of the present invention are illustrated above, it will be understood that the invention is obviously subject to variations and modifications without departing from its broader aspects. Thus, the liquid condensate containing oils and tars can be combined with the fibrous feed material prior to pyrolysis in conjunction with a variety of other preliminary treatments, e.g., dry preparation of the prebriquette pellet with the inclusion only of the liquid condensate as an additive to produce the desired charcoal briquette products.

What is claimed is:

1. A continuous process for the manufacture of charcoal from fibrous material selected from the group consisting of paper, paper board, wood particles, and cloth, comprising the steps of; pulping said fibrous material with a water base pulping solution comprised of gluten containing binders and lignosulfonate dispersing agents to reduce the fibrous material to a homogeneous fibrous mass in a saturated pulp having a liquid content of approximately 90%–99% by weight, compressing said saturated pulp to form a compacted pulp having a fiber content of at least approximately 50% by weight and which is substantially uniform in density, pyrolyzing said compacted pulp in a pyrolysis zone where preliminary pyrolysis occurs at temperatures between approximately 500° F. to 600° F. and exothermic pyrolysis occurs at temperatures between approximately 500° F. to 700° F. and high temperature pyrolysis occurs at temperatures above approximately 800° F., thereby forming a non-fibrous charcoal and a liquid condensate byproduct containing tars, oils, and water soluble fractions, cooling said charcoal to at least approximately 350° F., storing the cooled charcoal in an oxygen free atmosphere until temperature below combustion is reached, returning said liquid condensate byproduct to said water base pulping solution so that said homogeneous fibrous mass is impregnated with said byproduct, whereby said liquid condensate byproduct which has been impregnated in the fibrous structure of the pulp causes said fibrous structure to break down during the pyrolysis of said compacted pulp thereby producing charcoal having a non-fibrous structure.

2. The process of Claim 1 in which said fibrous material is shredded.

3. The process of Claim 1 in which said saturated pulp is partially deliquefied to obtain a pulp having a liquid content of approximately 83%–86% by weight.

4. The process of Claim 3 in which the partially deliquefied pulp is heated to at least about 120° F. to reduce the viscostiy of liquid contained in the partially deliquefied pulp.

5. The process of Claim 1 in which said compacted pulp is preheated in a temperature range of approximately 212° F. to about 300° F. to evaporate free moisture in said compacted mass and prevent condensation on the surface thereof.

6. A continuous process for the manufacture of charcoal from fibrous material selected from the group consisting of paper, paper board, wood particles, and cloth, comprising the steps of; pulping said fibrous material with a water base pulping solution comprised of gluten containing binders and lignosulfonate dispersing agents to reduce the fibrous material to a homogeneous fibrous mass in a saturated pulp having a liquid content of approximately 90%–99% by weight, compressing said saturated pulp to form a compacted pulp having a fiber content of at least approximately 50% by weight and which is substantially uniform in density, pyrolyzing said compacted pulp in a pyrolysis zone where preliminary pyrolysis occurs at temperatures between approximately 500° F to 600° F. and exothermic pyrolysis occurs at temperatures between approximately 500° F. to 700° F. and high temperature pyrolysis occurs at temperatures above approximately 800° F., thereby forming a non-fibrous charcoal and a liquid condensate byproduct containing tars, oils, and water soluble fractions, cooling said charcoal to at least approximately 350° F., storing the cooled charcoal in an oxygen free atmosphere until temperature below combustion is reached, returning said liquid condensate byproduct and impregnating the compacted pulp with said byproduct, whereby said liquid condensate byproduct which has been impregnated in the fibrous structure of the pulp causes said fibrous structure to break down during the pyrolysis of said compacted pulp thereby producing charcoal having a non-fibrous structure.

References Cited

UNITED STATES PATENTS

| | | | |
|---|---|---|---|
| 2,556,154 | 6/1951 | Kern | 201—23 |
| 1,561,322 | 11/1925 | Goskar | 44—23 |
| 2,066,457 | 1/1937 | Decker | 44—23 |
| 3,379,622 | 4/1968 | Drevsche | 201—8 |
| 2,131,702 | 9/1938 | Berry | 201—21 |
| 3,018,227 | 1/1962 | Baum | 201—23 |
| 3,637,464 | 1/1972 | Walsh | 44—10 C |

FOREIGN PATENTS

| | | | |
|---|---|---|---|
| 427,960 | 4/1935 | England | 203—29 |
| 1,983 | 6/1867 | England | 44—10 C |

OTHER REFERENCES

Carey, Pulp and Paper VI, Interscience Pub., N.Y. (1960) pp. 205–209.

NORMAN YUDOFF, Primary Examiner

H. H. BERNSTEIN, Assistant Examiner

U.S. Cl. X.R.

201—25, 23, 8, 29, 45